(12) United States Patent
Herlyn

(10) Patent No.: US 6,986,939 B2
(45) Date of Patent: Jan. 17, 2006

(54) PANEL-SHAPED COMPOSITE WOODEN ELEMENT

(75) Inventor: Johann W. Herlyn, Braunschweig (DE)

(73) Assignee: Fraunhofer-Gesellschaft zur Foerderung der Angewandten Forschung e. V., Munich (DE)

( * ) Notice: Subject to any disclaimer, the term of this patent is extended or adjusted under 35 U.S.C. 154(b) by 221 days.

(21) Appl. No.: 10/276,793

(22) PCT Filed: May 15, 2001

(86) PCT No.: PCT/DE01/01830

§ 371 (c)(1),
(2), (4) Date: May 14, 2003

(87) PCT Pub. No.: WO01/90502

PCT Pub. Date: Nov. 29, 2001

(65) Prior Publication Data

US 2004/0103616 A1 Jun. 3, 2004

(30) Foreign Application Priority Data

May 25, 2000 (DE) ........................... 200 09 571

(51) Int. Cl.
B32B 7/02 (2006.01)

(52) U.S. Cl. .................... 428/212; 428/218; 428/282.4; 442/348; 156/242; 264/113; 264/125

(58) Field of Classification Search ............... 428/212, 428/218, 282.4; 442/348; 156/242; 264/113, 264/125
See application file for complete search history.

(56) References Cited

U.S. PATENT DOCUMENTS 4,246,310 A * 1/1981 Hunt et al. ................ 428/106
4,756,955 A * 7/1988 Rias ........................... 442/348
5,059,466 A 10/1991 Blumer

FOREIGN PATENT DOCUMENTS

| DE | 27 56 303 | 6/1979 |
|----|-----------|--------|
| DE | 88 08 806.5 | 9/1988 |
| DE | 0 406 783 | 7/1990 |
| DE | 43 10 191 | 10/1993 |
| DE | 196 16 510 A1 | 4/1996 |
| DE | 299 19 919 | 2/2000 |
| FR | 2776956 | 4/1998 |
| GB | 1 399 402 | 2/1975 |
| GB | 2152063 A | 12/1984 |
| WO | WO 89/08539 | 3/1989 |
| WO | WO 89 08539 * | 9/1989 |

OTHER PUBLICATIONS

German Article; Holzbau–Taschenbuch, 1999.

Reference copies of of the 37 C.F.R. 1.97 and 1.98, 2000.

* cited by examiner

Primary Examiner—Leszek Killman
(74) Attorney, Agent, or Firm—Whitham, Curtis & Christofferson, P.C.

(57) ABSTRACT

The invention relates to a method for the manufacture of chipboard comprising a centre layer (18) of coarse chips and outer layers (20) of chips whose fibers are oriented in the plane of the board. In order to be able to reduce the density of the finished board while retaining the intrinsic characteristic profile of the board, it is proposed in accordance with the invention that the chips used to compose the centre layer (18) will comprise end-grain cut, flake-like chips (22) whose fibers are oriented in the thickness direction (24) of the chips, the chip fibers in the centre layer being oriented substantially transversely to the plane of the chipboard. The invention also relates to chipboard manufactured in accordance with the method.

13 Claims, 2 Drawing Sheets

PANEL-SHAPED COMPOSITE WOODEN ELEMENT

The invention relates to a panel-shaped composite wooden element.

Wood and wood-based materials are well-established building materials for the construction of buildings. Constructions based on modular elements and having a high proportion of wood or wood-based materials can provide a high degree of prefabrication which enables cost-effective and environmentally compatible building. Unlike solid wood, wood-based materials do not have the disadvantages of isotropic inhomogeneous material properties. Structurally oriented wood-based materials can be used in a component with optimal utilization of their properties, which makes more economical use of materials possible.

Constructions based on modular elements and comprising wood-based materials are traditionally characterized by two systems, namely the wooden panel type of construction and the skeleton type of construction. The older type of construction is the skeleton type of construction, the origin of which can still be found in the forerunner to framework construction, i.e. post and beam construction. In the case of the skeleton type of construction, the vertical loads are transferred by way of solid wood supports which reach over separate stories. Struts or tie members in the walls serve primarily to brace the building against horizontal loads. Wood-based boards are mounted to some extent on one or both sides of the skeleton building walls, but these are not considered to be involved in the load-supporting function.

In the case of the wooden panel type of construction by contrast, the paneling, consisting, for example, of wood-based boards or gypsum fiberboards or gypsum plasterboards, are also effective in transferring the load. They are conoidered in the calculation both for bracing against horizontal loads and for load transfer of the vertical loads. This makes it possible to use timbers having smaller cross-sectional arcas than in the skeleton type of construction for the load-transferring ribs. In the case of wooden panel elements, a solid wood ribbed construction is decked with panel-shaped wood-based materials. Thermal insulation is provided by incorporating thermal insulation materials made of non-wood-based materials into the interspaces between the solid wood ribs. The solid wood ribbed construction, together with the wood-based paneling, has a supporting function. A disadvantage is the virtually rigidly fixed rib spacing of approximately 0.625 m. As a result, a large number of individual components must be joined together for the production of a large surface area. It is an additional disadvantage that the known wooden panel elements are produced from numerous building materials, such as solid wood, wood-based materials, insulating materials, plastic sheets, etc, each having specific functions and requiring different joining techniques. The large number of building materials and joining operations results in high expenditure being entailed in respect of the production of the wooden panel elements, material consumption and logistics. A further disadvantage is the effort and expenditure required for disposing of the wooden panel elements.

It was an object of the invention to provide an improved panel-shaped composite wooden element which performs both a load-transferring and a thermally insulating function.

The object is achieved by the panel-shaped composite wooden element having the features of claim 1 by means of a load-transferring and thermally insulating core and at least one cover layer on the core surface, the core and the cover layer each being formed from wood-based materials.

According to the invention, a composite cross section is thus provided which consists only of wood-based materials. In this context, use is made of the fact that wood-based materials, by comparison with other building materials, have high strength and at the same time a low apparent density. According to the invention, however, the wood-based materials of the composite cross section are not only load-transferring but also thermally insulating. The apparent density is correspondingly suited to this end. The use of only wood-based materials as similar basic raw materials which are involved both in the supporting effect and in the thermally insulating function makes it possible for material consumption to be reduced. Elements with a large surface area which are easy to process can be produced with a high degree of prefabrication.

The apparent density of the core should be at maximum approximately 500 kg/m$^3$ in order to ensure an adequate load-transferring function but also a thermally insulating effect. For the purpose of thermal insulation, the thermal conductivity of the core should be less than 0.1 W/(m$^2$K).

At least one of the cover layers should have a higher resistance to water vapor diffusion than the opposite cover layer. At least one of the cover layers should be of low flammability or noncombustible and also load-transferring and/or thermally insulating. In this case too, to ensure the load-transferring function, the cover layer should have an apparent density of at least approximately 500 kg/m$^3$ and, to ensure a thermally insulating function, a thermal conductivity of between 0.1 W/(m$^2$K) and 0.2 W/(m$^2$K).

It is advantageous if the borders on the outer edges of the core also have at least one cover layer. The borders can additionally have connection elements for the purpose of coupling abutting composite wooden elements.

It is particularly advantageous if the core and/or the cover layers is or are in each case formed from a wood-based composite comprising wood-based materials with different particle structures. The particle structures of the respective wood-based materials may be fibers or chips, for example, which are connected to one another using different binders. In addition, because the same starting raw material, i.e. wood, is used, it is possible to join the elements together using a uniform joining technique, for example, a gluing operation. The composite cross sections can also have varied apparent densities. Thus, for example, the core can be a porous wooden fiberboard. Examples of cover layers which can be used are chipboards, medium density fiberboards (MDF) or oriented strand boards (OSB) or plywood boards.

The invention is explained in more detail below by way of the accompanying drawings, in which.

Figure 1:
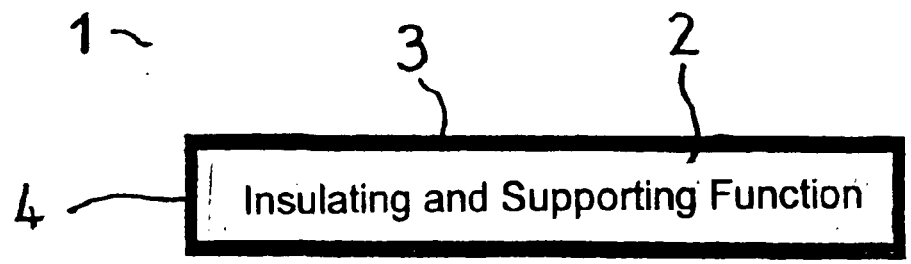
FIG. 1 shows a horizontal section through a panel-shaped composite wooden element according to the invention.

FIG. 1 reveals a horizontal section through the panel-shaped composite wooden element 1 according to the invention, which shows the principal structure of the composite cross section together with the functions of the individual components. The modular panel-shaped composite wooden element 1 is composed of a core 2 and cover layers 3 on the core surface and on the borders as a surround 4. The core 2 is designed in such a way that it fulfills static or load-transferring and simultaneously heat-insulating purposes. The cover layer 3 fulfills supporting and moisture-protecting and, where appropriate, also fire-retarding purposes. In this arrangement, the thermally insulating wood-based materials in the core 2 are also involved in the supporting effect.

The panel-shaped composite wooden elements 1 can be used, for example, as wall, roof or ceiling elements for the construction of prefabricated houses, in which case openings for windows, doors, roller shutters, etc., can be made easily. The borders at the reveals of the openings should, like the borders on the outer edges, be provided with a surround 4 made of wood-based materials. In this case the composite wooden elements 1 act statically both fox the purpose of transferring vertical loads and for the purpose of bracing against horizontal loads. Furthermore, individual forces from bracket loads and horizontal impact are absorbed. The composite wooden element 1 can be used both as an external and as an internal wall. To ensure fire and weather protection, it is possible to apply additional cover layers or further component layers.

The surround 4 is also formed from wood-based materials. On the one hand, it is required for static reasons and ensures a supporting function. On the other hand, the surround 4 also serves for mounting and joining the composite wooden elements.

The core 2 and/or the cover layer 3 is or are formed from wood-based materials which have different particle structures, such as fibers or chips, and are connected to one another using various binders. Suitable binders are organic and inorganic substance. In addition, because the same starting raw material, i.e. wood, is used, it is possible to join the elements together using a uniform joining technique, for example a gluing operation. The apparent densities of the wood-based materials used can be varied according to the demands made on the insulating or supporting properties.

It is also possible to provide cavities in the cross section of the composite wooden elements 1 for the purpose of receiving house installations and for the purpose of saving material.

The use of composite wooden elements 1 made of wood-based materials has the advantage that additional building elements can be attached with little effort to the composite wooden elements, either mechanically or by gluing.

Figure 2:
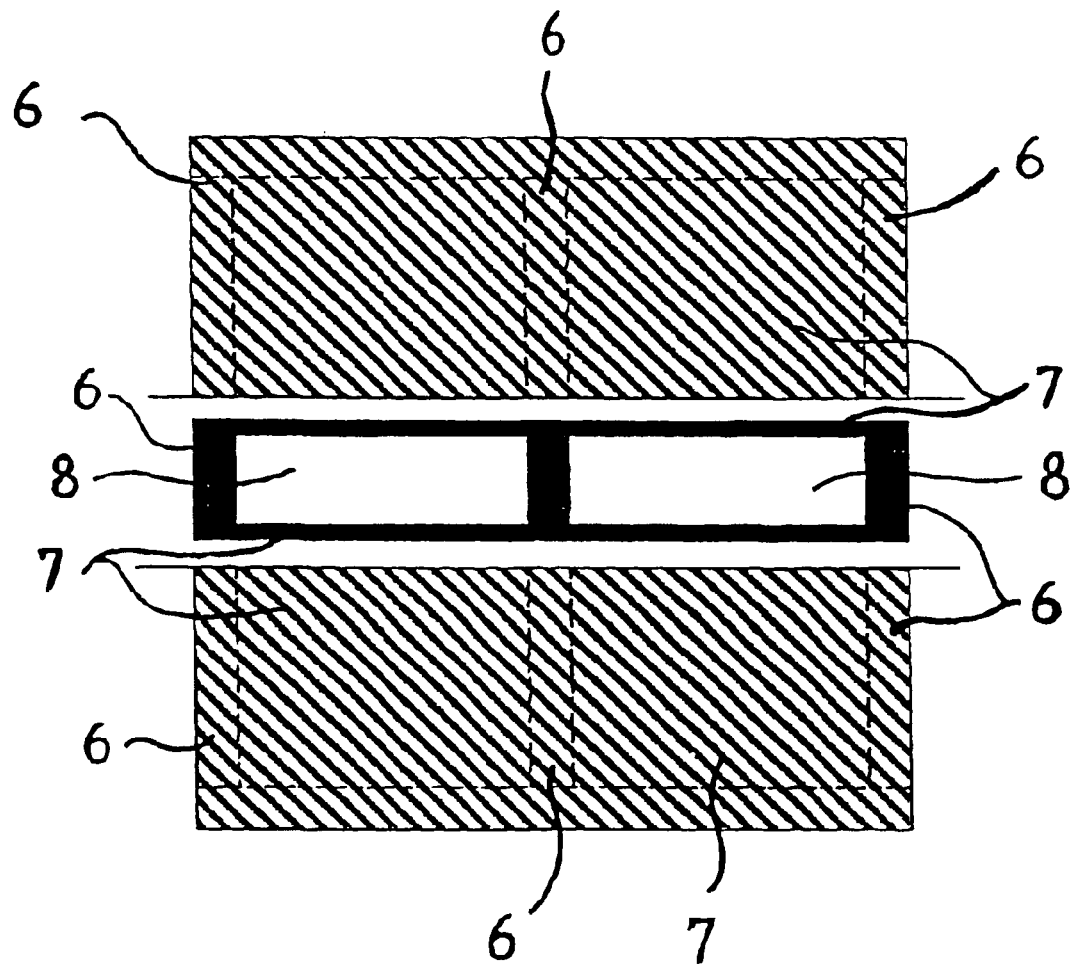
FIG. 2 shows a horizontal section of a conventional wooden panel element.

FIG. 2 shows a horizontal section through a conventional wooden panel element 5. The wooden panel element 5 is formed substantially from a solid wood ribbed construction 6 which is decked with wood-based boards 7. The solid wood ribbed construction 6, together with the wood-based paneling 7, performs a supporting function. For the purpose of thermal insulation, insulating material a is provided between the solid wood ribbed construction, said material not performing a supporting function and not being made of wood-based material.

By contrast with this, the core 2 in the panel-shaped composite wooden element 1 according to the invention is designed in such a way that it has both load-transferring and thermally insulating properties. A separate, merely thermally insulating layer 8 is not provided in the composite wooden element 1 of FIG. 1.

Figure 3:
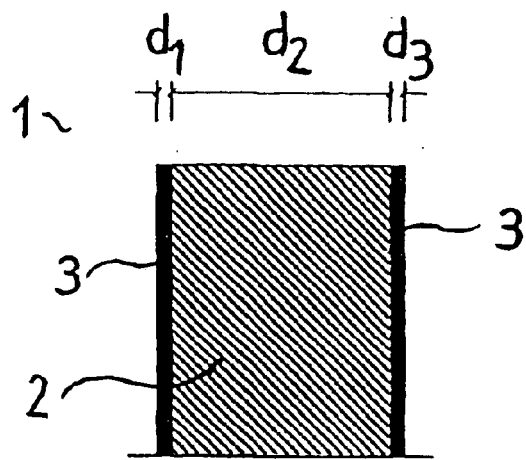
FIG. 3 shows a panel-shaped composite wooden element having a one-part core and a covet layer on the core surface.

FIG. 3 reveals the panel-shaped composite wooden element 1 according to the invention, in which the core 2 is formed from a porous wooden fiberboard. The porous wooden fiberboard here has an apparent density of at maximum approximately 500 kg/m$^3$ and a thermal conductivity of less than 0.1 W/(m$^2$K). The core surface is covered with, for example, a glued-on cover layer 3 which is, for example, a chipboard, a medium density fiberboard, an oriented strand board (OSB) or a plywood board.

It is advantageous if the core 2 is about 50 to 300 mm thick and the cover layers 3 about 60 to 80 mm thick.

Figure 4:
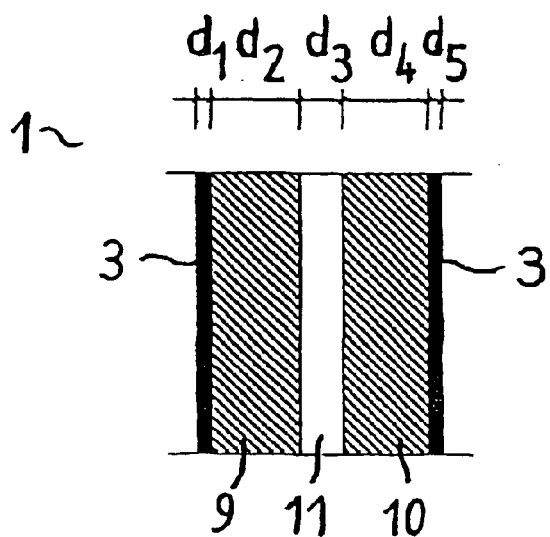
FIG. 4 shows a panel-shaped composite wooden element having a two-part core with an air layer.

FIG. 4 reveals such an embodiment, in which, for example, there are provided two porous fiberboards 9, 10 which are arranged parallel to one another and between which there is an air layer 11. The air layer 11 serves for thermal insulation and for installing supply lines. The surfaces of the cores 9 and 10 are again covered with a cover layer 3. The thickness of the cores should be 20 to 200 mm in each case. The air layer 11 should be approximately 10 to 100 mm thick. The cover layers 3 should again be about 6 to 80 mm thick.

Figure 5:
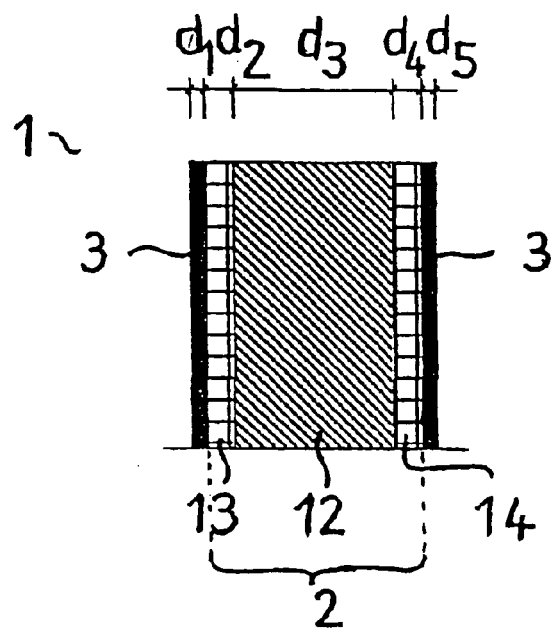
FIG. 5 shows a panel-shaped composite wooden element having a multi-part core.

FIG. 5 reveals an embodiment of the panel-shaped composite wooden element 1 in which the core 2 is formed from wood-based materials of differing apparent density. Here, the core 2 is composed, for example, of a porous fiberboard 12 which is respectively covered by a medium density fiberboard 13, 14. The porous fiberboard 12 is glued together with the medium density fiberboards 13, 14.

The thickness of the porous fiberboard 12 should be approximately 20 to 200 mm. The medium density fiberboards (MDF) 13, 14 should be about 10 to 100 mm wide. The cover layers should again have a thickness of 6 to 80 mm.

What is claimed is:

1. A panel-shaped composite wooden element (1) for use as a supporting panel element for construction, characterized by a load-transferring and thermally insulating core (2) and at least one separate cover layer (3) which is integrally connected to the core surface, the core (2) and the cover layer (3) each being formed from a wooden particle composite, the apparent density of the core (2) for the load-transferring function being at maximum approximately 500 kg/m$^3$ and at least one of the cover layers (3) being load-transferring and having an apparent density of at least approximately 500 kg/m$^3$.

2. The panel-shaped composite wooden element (1) as claimed in claim 1, characterized in that the thermal conductivity of the core (2) for the thermally insulating function is less than 0.1 W/(m$^2$K).

3. The, panel-shaped composite wooden element (1) as claimed in one of the preceding claims, characterized in that at least one of the cover layers (3) has a higher resistance to water vapor diffusion than the opposite cover layer.

4. The panel-shaped composite wooden element (1) as claimed in one of the preceding claims, characterized in that at least one of the cover layers (3) has low flammability or is noncombustible.

5. The panel-shaped composite wooden element (1) as claimed in one of the preceding claims, characterized in that the borders on the outer edges of the core (2) have at least one cover layer (3).

6. The panel-shaped composite wooden element (1) as claimed in one of the preceding claims, characterized in that at least one of the cover layers (3) is thermally insulating and has a thermal conductivity of between 0.1 W/(m$^2$K) and 0.2 W/(m$^2$K).

7. The panel-shaped composite wooden element (1) as claimed in one of the preceding claims, characterized in that the core (2) and/or the cover layers (3) is or are each formed from a composite comprising wood-based materials with different particle structures.

8. The panel-shaped composite wooden element (1) as claimed in one of the preceding claims, characterized in that the core (2) is formed from at least one porous fiberboard.

9. The panel-shaped composite wooden element (1) as claimed in one of the preceding claims, characterized in that at least one of the cover layers (3) is a chipboard.

10. The panel-shaped composite wooden element (1) as claimed in one or the preceding claims, characterized in that at least one of the cover layers (3) is a medium density fiberboard (MDF).

11. The panel-shaped composite wooden element (1) as claimed in one of the preceding claims, characterized in that at least one of the cover layers (3) is an oriented strand board (OSB).

12. The panel-shaped composite wooden element (1) as claimed in one of the preceding claims, characterized in that at least one of the cover layers (3) is a plywood board.

13. The panel-shaped composite wooden element (1) as claimed in one of the preceding claims, characterized in that cavities are provided for the purpose of receiving house installations and/or for the purpose of saving material.

* * * * *